March 4, 1969  F. NAGEL  3,430,401

HONING TOOLS

Filed Sept. 17, 1965

INVENTORS
FRIEDRICH NAGEL, DECEASED,
BY PETER NAGEL,
WOLF NAGEL,
URSEL FISCHER, HIS HEIRS

BY Sparrow and Sparrow
ATTORNEYS

United States Patent Office 3,430,401
Patented Mar. 4, 1969

3,430,401
HONING TOOLS
Friedrich Nagel, deceased, late of Nurtingen, Wurttemberg, Germany, by Peter Nagel and Wolf Nagel, both of Hindenburgstr. 56, Nurtingen, Wurttemberg, Germany, and Ursel Fischer, Ahornweg 9, Nurtingen, Wurttemberg, Germany, heirs
Filed Sept. 17, 1965, Ser. No. 489,463
U.S. Cl. 51—331                                 5 Claims
Int. Cl. B24b 9/02, 49/00, 51/00

ABSTRACT OF THE DISCLOSURE

A honing tool with radially adjustable, spring-loaded bars between two adjacent honing stones on the circumference of the tool. A radially directed jet bore in each one of said bars for emitting a measuring jet; an air feeding channel in each one of said bars and stops on said tool for limiting the stroke of said bars.

---

The present invention relates to honing tools.

Honing tools are known in which at least one radially directed measuring jet is arranged between the radially adjustable honing stones on the circumference of a tool head, and which enables the diameter of the bore in the workpiece to be assessed during machining. In this case the measuring jets are firmly attached to the honing tool head and therefore determine the minimum diameter of the bore in the workpiece at the start of machining. Accordingly, only work-piece bores having a very small machining allowance can be machined by such honing tools. The object of the invention is to produce a honing tool which can be inserted into the bore even when greater machining allowances are required, without the danger of the workpiece being damaged by building.

According to the present invention there is provided a honing tool having at least one radially directed measuring jet between radially adjustable honing stones on the circumference of a tool head, in which each measuring jet and an air feed-channel therefor are disposed in a bar which is radially movable in the honing tool head and is urged outwardly towards a limiting stop by spring means.

By using a honing tool embodying the present invention a greater machining allowance is possible during the machining of the workpiece. If the bore diameter is too small, the bar jib is forced back by the surface of the bore. The actual measuring commences only when the bar, during enlargement of the diameter of the bore has moved radially outwards to the point of contact with the stop.

Furthermore, if the stop is adjustable, the measuring and work regions respectively can be varied and an adjustment carried out. One end of the bar is preferably pivotally mounted in a radial groove in the tool head at a distance from the jet.

Figure 1:
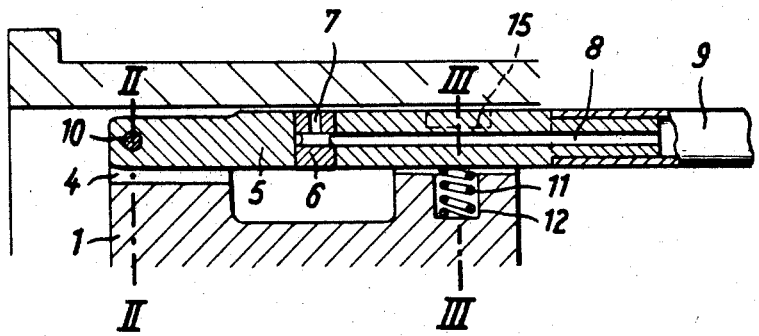
Figure 2:
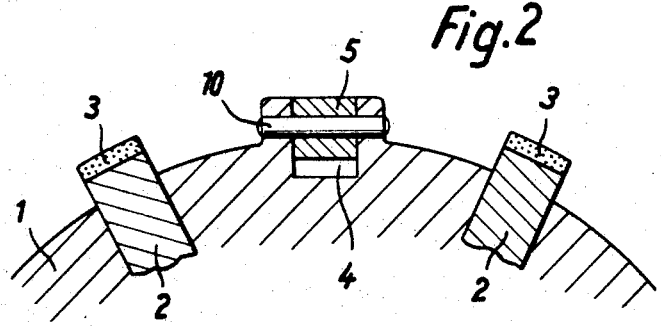
Figure 3:
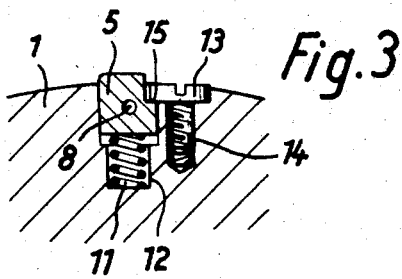

The present invention will be further described by way of example with reference to the accompanying drawings which show one embodiment of the invention and in which:

FIG. 1 is a longitudinal section of a honing tool head in the region of a measuring jet bar,
FIG. 2 is a section along the line II—II of FIG. 1,
FIG. 3 is a section on the line III—III of FIG. 1.

Honing stones 2 having abrasive layers 3 are radially adjustably received in radial grooves in tool head 1 of a honing tool (FIG. 2). The honing stones 2 can be moved radially outward by means of a conical expansion mandrel which is connected to the drive and which is not shown in the drawings. Between two adjacent honing stones 2, preferably in two diametrically opposite positions, a bar 5 is disposed in a radial groove 4 in the tool head 1, and is being radially movable. Preferably a second bar (not shown) is also provided and is diametrically opposite to the bar 5. A jet element 6, having a jet bore 7 which leads radially outwards, is inserted into the bar 5. The jet bore 7 is in communication with a longitudinal channel 8 in the bar 5. The channel 8 leads out of the bar 5 at the end facing the machine spindle. A flexible tube 9 is attached to this end of the bar and leads in conventional manner to a pipe for feeding air at constant pressure and also to a measuring device which, when the honing tool is in use, displays any decrease in pressure upstream of the jet in terms of increase in diameter of the workpiece of the jet.

In the illustrated embodiment of the invention the end of the bar 5 that is remote from the machine spindle is pivotably mounted within the radial groove 4 of the tool head 1, by a hinge-pin 10 at a distance from the jet bore 5. Furthermore, the bar is urged outwardly by a spring 11 which, in the illustrated embodiment of the invention, is disposed in a radial bore 12 of the tool head 1. The radial outward movement of the bar 5 is limited by an adjustable stop which, in the illustrated embodiment, is formed by head 13 of a screw 14 received in a threaded radial bore in the tool head, wherein the screw head engages in a lateral recess 15 in the bar 5 (FIG. 3).

Instead of being pivotable, the bar 5 could also be arranged for parallel movement within the radial groove 4 of the tool head 1, by for example, two pins contained in radial bores in the tool head.

I claim:
1. In a honing tool having a tool head provided with a series of honing stones adapted to engage a surface of a workpiece to be machined, a groove in the surface of said tool head intermediate two of said honing stones, a member hingedly received in said groove, resilient means for urging said member outwardly relatively to said tool head, stop means for limiting the outward movement of said member relatively to said groove, air discharge means on said member, said member having a channel adapted for supplying air to said discharge means, said discharge means being adatped to discharge air towards said surface of the workpiece.

2. A tool according to claim 1, said tool head being substantially cylindrical and said groove extending radially and having an opening in its cylindrical surface to receive said member.

3. A tool according to claim 1, said groove receiving said member, and said stop means being adjustable.

4. A tool according to claim 1, said groove receiving said member, said member being hinged at one end, and a part of said member spaced from said end being resiliently radially outwardly urged by spring means, said discharge means being disposed on said member intermediate said end and said part.

5. A tool according to claim 4, in which said stop means is a screw.

References Cited

UNITED STATES PATENTS

| 2,622,331 | 12/1952 | Haines. | |
| 2,680,912 | 6/1954 | Wylie. | |
| 2,821,049 | 1/1958 | Harris | 51—165 X |
| 2,831,297 | 4/1958 | Skran | 51—165 X |
| 3,059,381 | 10/1962 | Greening | 51—165 X |

LESTER M. SWINGLE, Primary Examiner.
D. G. KELLY, Assistant Examiner.